US010878276B2

(12) United States Patent
Martin et al.

(10) Patent No.: US 10,878,276 B2
(45) Date of Patent: Dec. 29, 2020

(54) METHOD AND SYSTEM FOR DETECTING CHANGE OF CONTEXT IN VIDEO STREAMS

(71) Applicant: HRL Laboratories, LLC, Malibu, CA (US)

(72) Inventors: Charles E. Martin, Santa Monica, CA (US); Nigel D. Stepp, Santa Monica, CA (US); Soheil Kolouri, Agoura Hills, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 42 days.

(21) Appl. No.: 16/415,942

(22) Filed: May 17, 2019

(65) Prior Publication Data

US 2019/0370598 A1    Dec. 5, 2019

Related U.S. Application Data

(60) Provisional application No. 62/680,966, filed on Jun. 5, 2018.

(51) Int. Cl.
| | | |
|---|---|---|
| *G06K 9/00* | (2006.01) | |
| *G06K 9/46* | (2006.01) | |
| *G06K 9/62* | (2006.01) | |
| *G06N 3/08* | (2006.01) | |

(52) U.S. Cl.
CPC ......... *G06K 9/4676* (2013.01); *G06K 9/6267* (2013.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 9,571,628 B1* | 2/2017 | Bostick | H04M 15/8033 |
| 2017/0083772 A1 | 3/2017 | Kim et al. | |
| 2017/0124447 A1* | 5/2017 | Chang | G06F 16/3334 |
| 2017/0262995 A1 | 9/2017 | Li et al. | |
| 2018/0033144 A1 | 2/2018 | Risman et al. | |
| 2018/0120843 A1 | 5/2018 | Berntorp et al. | |
| 2018/0144208 A1 | 5/2018 | Lu et al. | |

(Continued)

OTHER PUBLICATIONS

Yang, Video Captioning by Adversarial LSTM, Nov. 2018, IEEE Transactions on Image Processing, vol. 27, No. 11 (Year: 2018).*

(Continued)

*Primary Examiner* — Alex Kok S Liew
(74) *Attorney, Agent, or Firm* — Tope-McKay & Associates

(57) ABSTRACT

Described is a system for detecting change of context in a video stream on an autonomous platform. The system extracts salient patches from image frames in the video stream. Each salient patch is translated to a concept vector. A recurrent neural network is enervated with the concept vector, resulting in activations of the recurrent neural network. The activations are classified, and the classified activations are mapped onto context classes. A change in context class is detected in the image frames, and the system causes the autonomous platform to perform an automatic operation to adapt to the change of context class.

18 Claims, 9 Drawing Sheets

(56) References Cited

U.S. PATENT DOCUMENTS

2019/0028707 A1* 1/2019 Yu .......................... G06T 7/337

OTHER PUBLICATIONS

Notification of Transmittal of International Search Report and the Written Opinion of the International Searching Authority for PCT/US2019/033326; dated Sep. 11, 2019.
International Search Report of the International Searching Authority for PCT/US2019/033326; dated Sep. 11, 2019.
Written Opinion of the International Searching Authority for PCT/US2019/033326; dated Sep. 11, 2019.
Maass, W., Matschlager, T., & Markram, H. (2002). Real-time computing without stable states: a new framework for neural computation based on perturbations. Neural Comput., 14, pp. 2531-2560.
Maass, W., & Sontag, E. D. (2000). Neural systems as nonlinear filters. Neural Computation, 12(8), pp. 1743-1772.
Stepp, N., Plenz, D. & Srinivasa, N. (2015). Synaptic Plasticity Enables Adaptive Self-Tuning Critical Networks. PLOS Computational Biology 11(1): e1004043, pp. 1-28.
Yu, A. J. (2006). Optimal Change-Detection and Spiking Neurons. In NIPS, pp. 1545-1552.
Milan, K. et al. (2016). The Forget-Me-Not Process. 30th Conference on Neural Information Processing Systems, pp. 1-9.
Melamud, O. et al. (2016). Context2Vec: Learning Generic Context Embedding with Bidirectional LSTM, pp. 1-11.
Kanerva, P. (2009). Hyperdimensional Computing: An Introduction to Computing In Distributed Representation with High-Dimensional Random Vectors. Cognitive Computing, vol. 1, pp. 139-159.

* cited by examiner

| Parameter | Description | Value |
|---|---|---|
| $A^+$ | STDP maximum increase | 0.00134 |
| $\beta$ | STDP maximum decrease factor | 6 |
| $w_{exc}$ | Initial excitatory weight | 1.133 |
| $w_{inh}$ | Initial inhibitory weight | 1.174 |
| $g_{exc}^{max}$ | Excitatory weight gain | 0.3976 |
| $g_{inh}^{max}$ | Inhibitory weight gain | 1.470 nS |
| $\tau^+$ | STDP increase timescale | 4.648 nS |
| $\tau^-$ | STDP decrease timescale | 20 ms |
| $\tau_D$ | STP depression timescale | 8 ms |
| $\tau_F$ | STP facilitation timescale | 25 ms |
| $U$ | STP utilization factor | 26 ms |
|  |  | 0.5 |

METHOD AND SYSTEM FOR DETECTING CHANGE OF CONTEXT IN VIDEO STREAMS

CROSS-REFERENCE TO RELATED APPLICATIONS

This is a Non-Provisional application of U.S. Provisional Application No. 62/680,966, filed in the United States on Jun. 5, 2018, entitled, "Method and System for Detecting Change of Context in Video Streams," the entirety of which is incorporated herein by reference.

BACKGROUND OF INVENTION

(1) Field of Invention

The present invention relates to a system for detecting change of context in input images, and more particularly, to a system for detecting change of context in input images through identification of image components, creating activation vectors of the image components, and feeding the activation vectors into a recurrent spiking neural network.

(2) Description of Related Art

Contextual image classification is an approach of classification based on contextual information in images. For context recognition in videos, Google DeepMinds's Forget-Me-Not-Process (see the List of Incorporated Literature References, Literature Reference No. 5) segments a video stream into discrete tasks. However, this approach is limited to low resolution images (e.g., 28×28 pixels frames).

Some existing methods use a recurrent network, such as a Long Short-Term Memory (LSTM) network (see Literature Reference No. 6), to process time-series data and then cluster the data, for example, using a self-organizing map (SOM). A SOM can be trained online, but convergence would be too slow to detect previously unseen contexts and surprising events.

Thus, a continuing need exists for an approach to context recognition that can quickly identify changes in context in images extracted from a video stream using identified image components as input time-series rather than low-level pixel data.

SUMMARY OF INVENTION

The present invention relates to a system for detecting change of context in input images, and more particularly, to a system for detecting change of context in input images through identification of image components, creating activation vectors of the image components, and feeding the activation vectors into a recurrent spiking neural network. The system comprises one or more processors and a non-transitory computer-readable medium having executable instructions encoded thereon such that when executed, the one or more processors perform multiple operations. The system extracts salient patches from a plurality of image frames in the video stream. Each salient patch is translated to a concept vector. The concept vector enervates a recurrent neural network, resulting in activations of the recurrent neural network. The activations of the recurrent neural network are classified, and the classified activations are mapped onto context classes. The system detects a change of context class in the plurality of image frames and causes an autonomous platform to perform an automatic operation to adapt to the change of context class.

In another aspect, in extracting the salient patches, the system processes each image frame in the plurality of image frames with a feature-generating network, resulting in a set of activations; applies non-negative matrix factorization to the set of activations in a plurality of layers of the feature-generating network, resulting in potentially salient regions in each image frame; and performs blob-detection for mapping the potentially salient regions to the salient patches.

In another aspect, in translating each salient patch to a concept vector, the system processes each salient patch by a feature-generating network having a plurality of layers; high-dimensional concept vectors are extracted by averaging the set of activations across each layer of the feature-generating network; and reducing the high-dimensional concept vectors to a low-dimensional concept vector of concept components using Hebbian Principal Component Analysis.

In another aspect, a set of connection weights in the recurrent neural network are a distributed representation of a context.

In another aspect, the recurrent neural network comprises a fully connected layer with spiking leaky integrate-and-fire (LIF) neurons, implementing both excitatory and inhibitory Spike-Timing Dependent Plasticity (STDP) and Short Term Potentiation (STP).

In another aspect, the recurrent neural network comprises a spiking network layer having an excitatory sub-network and inhibitory sub-network, wherein the excitatory sub-network is fully connected and the inhibitory sub-network is randomly connected with a predetermined connection probability, and wherein the excitatory sub-network and the inhibitory sub-network are connected with the predetermined connection probability.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a table illustrating spiking network parameters according to some embodiments of the present disclosure;

DETAILED DESCRIPTION

Figure 1:
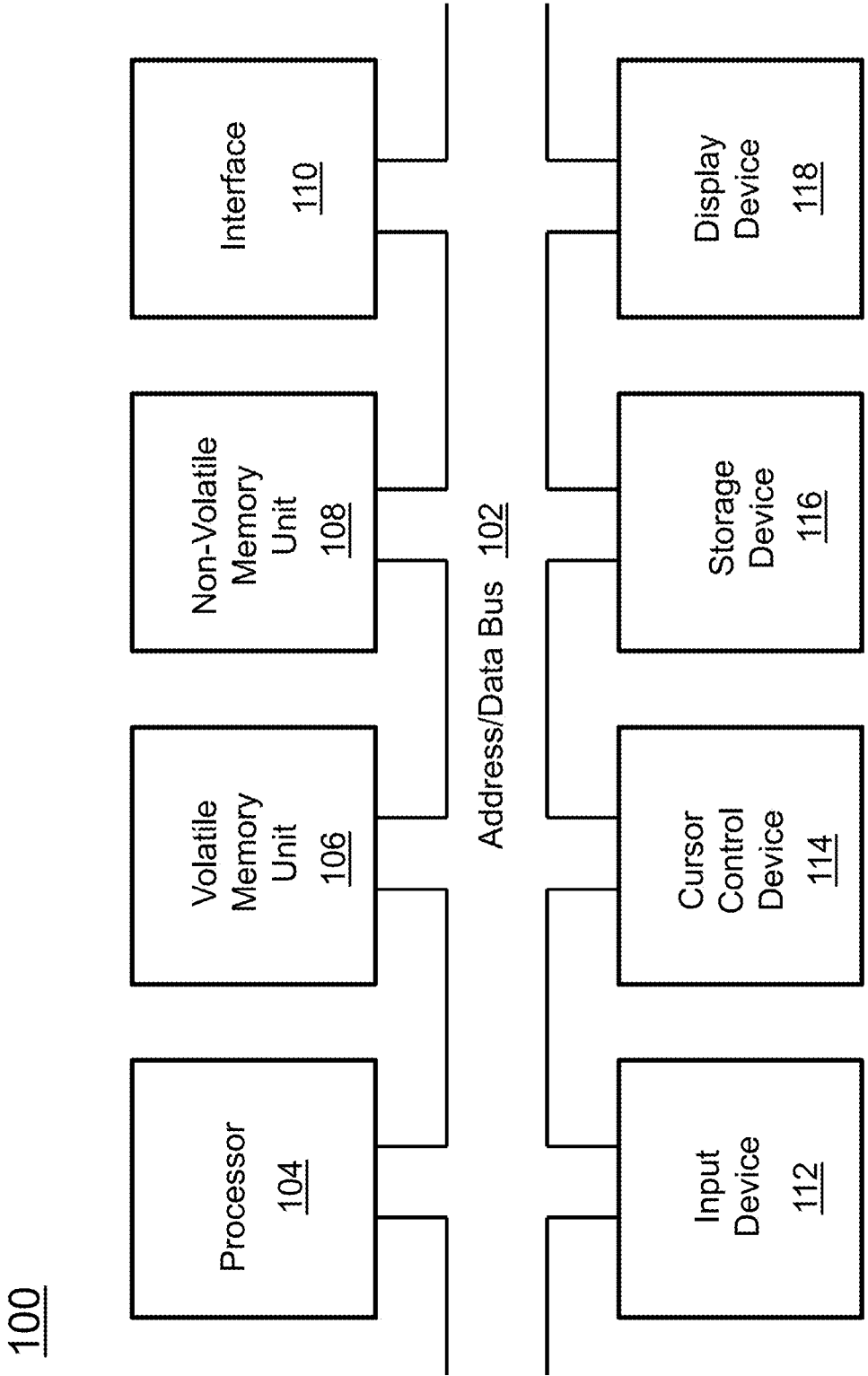
FIG. 1 is a block diagram depicting the components of a system for detecting change of context in input images according to some embodiments of the present disclosure.

The present invention relates to a system for detecting change of context in input images, and more particularly, to a system for detecting change of context in input images through identification of image components, creating activation vectors of the image components, and feeding the activation vectors into a recurrent spiking neural network. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Maass, W., Matschlager, T., & Markram, H. (2002). Real-time computing without stable states: a new framework for neural computation based on perturbations. Neural Comput., 14, 2531-2560.
2. Maass, W., & Sontag, E. D. (2000). Neural systems as nonlinear filters. Neural Computation, 12(8), 1743-1772.
3. Stepp, N., Plenz, D. & Srinivasa, N. (2015). Synaptic Plasticity Enables Adaptive Self-Tuning Critical Networks. PLOS Computational Biology 11(1): e1004043.
4. Yu, A. J. (2006). Optimal Change-Detection and Spiking Neurons. in NIPS, 1545-1552.
5. Milan, K. et al, (2016). The Forget-Me-Not Process, $30^{th}$ Conference on Neural information Processing Systems.
6. Melamud, O. et al. (2016). Context2Vec: Learning Generic Context Embedding with Bidirectional LSTM.
7. Kanerva, P. (2009). Hyperdimensional Computing: An Introduction to Computing In Distributed Representation with High-Dimensional Random Vectors. Cognitive Computing, Vol. 1, pp. 139-159.

(2) PRINCIPAL ASPECTS

Various embodiments of the invention include three "principal" aspects. The first is a system for detecting change of context in input images. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
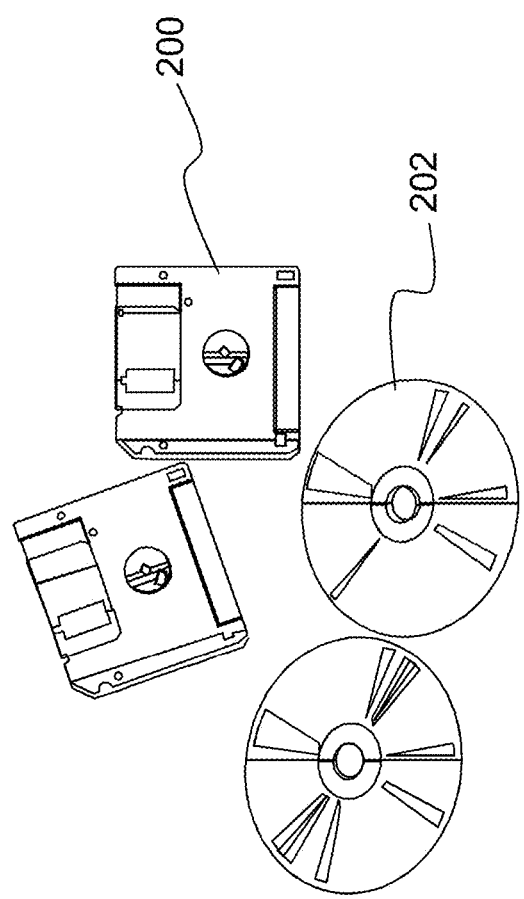
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The invention described herein provides a system that can classify a change of context in a video feed and initiate an action based on such a classification. The method according to embodiments of the present disclosure dissects images in the video feed into image components, creates an activation vector of these components, and feeds these activations into a recurrent spiking neural network. The change in the dynamics of the neural network indicates a change of context in the video. Non-limiting examples of a change of context could be a change in scenery going to from a coastal landscape to an urban setting; transitioning from driving on a highway to city streets; an airplane or rotorcraft transitioning from take-off to flight; and a robot moving between different rooms in a house (e.g., family room to kitchen).

One purpose of the system described herein is to assist the automatic processing of surveillance video feeds. Intelligence, surveillance and reconnaissance (ISR) applications are overwhelmed with video data and automatic means are required to process them. The invention described herein provides a means to automatically classify image frames from a video stream into groups of images ordered by context; therefore, simplifying further processing. Moreover, the system can initiate an action based on the change in context, such as sending a signal to a human operator (or a machine program) alerting about a change in context. Non-limiting examples of alert types include a generic visual or audio signal bringing attention (human or machine resources) to the video stream for further analysis; and a visual signal indicating specific objects or relationships in the video stream that indicate a change in context. Other actions include causing the associated platform or system to move or perform an operation based on the context classification. These aspects are described in further detail below.

(4) SPECIFIC DETAILS OF VARIOUS EMBODIMENTS

As described above, a key purpose of the invention according to embodiments of the present disclosure is to identify changes in context in a sequence of image frames extracted from a video stream (e.g., from a camera mounted on a surveillance drone, or a camera mounted on an autonomous platform (robot, self-driving vehicle). The change in context can be transmitted as an electric signal to an analyst or a machine system analyzing the video feed.

The invention described herein uses two main components, a Deep Sense Learning (DSL) framework (described in U.S. 2018/0285699, which is hereby incorporated by reference as though fully set forth herein) to perform unsupervised concept learning from high-dimensional multi-modal data (e.g., standard video (i.e., from camera data)+ audio stream, radar stream+standard video, LIDAR scan+ standard video) and a self-tuning neural dynamical system (SNDS) to map the concept stream to unique contexts. Concepts are higher-level entities extracted from the sensor signals. Entities can be objects, such as "car", or "lane marking", and relationships or attributes, such as "car changing lanes" or "truck is stopped". In other words, a concept is the decomposition of an image object into its components.

The large memory capacity of the SNDS (see Literature Reference No. 3 for a description of the SNDS) and its ability to amplify subtle differences in input streams gives the system according to embodiments of the present disclosure the ability to continually learn new contexts without forgetting previously learned contexts, even if those contexts are very similar. When a context is represented by a high-dimensional vector (e.g., 10,000-bits), many of the bits can be changed (more than a third) by natural variation in stimulus and by random errors and noise. The resulting vector can still be identified with the correct one, in that it is closer to the original "error-free" vector than to any unrelated vector chosen so far, with near certainty (see Literature Reference No. 7). Literature Reference Nos. 1 and 2 describe high-dimensional dynamical systems used for computing (e.g., filtering input signals). Furthermore, the SNDS is self-tuning and, thus, it does not require extensive tuning by hand nor does it need to be trained using a supervised learning objective (see Literature Reference No. 3).

Features from a deep neural network, or any set of values that constitutes an abstract representation of input data, are assumed to encode concepts. The success of DSL lends validity to this assumption, and so the DSL framework was extended to cases where the input dimension is variable. The input dimension depends on the number of different types of entities extracted from the video stream at a given time. For example, if the stream contains 2 cars and 1 person, the dimension is 2. In this Dynamic DSL (DDSL), patterns of activations are sampled from the evolving feature-generating network. These patterns of activations are determined using fast matrix factorization techniques, such as non-negative matrix factorization (NMF), followed by blob-detection. DDSL transforms these activations into a high-dimensional (~1000) representation of concepts. A Hebbian Principal Component Analysis (PCA) technique maps the arbitrary-length high-dimensional concept vectors to a fixed length low-dimensional (~50) vector of concept components. From there, concept activations are used to enervate, with one-to-one connectivity, a fully connected network with self-tuning synaptic plasticity.

Figure 3:
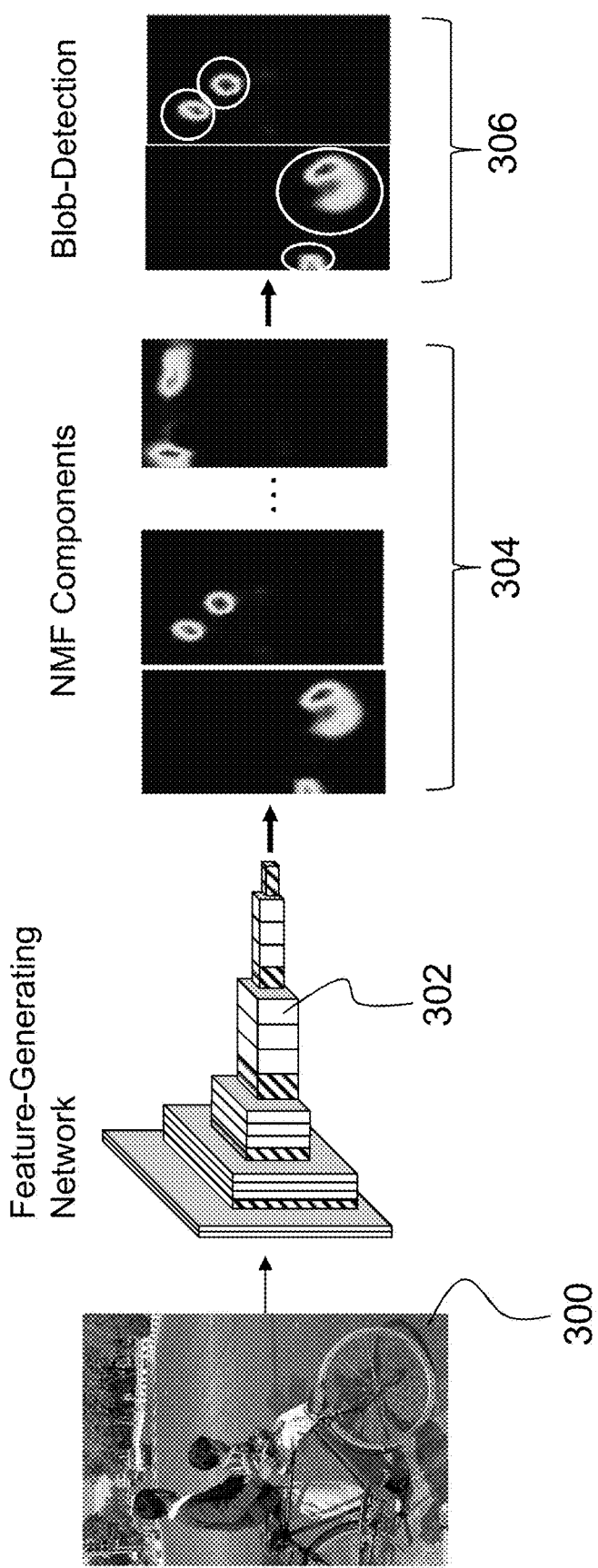
FIG. 3 is an illustration of identification of salient patches with an image using dynamic deep sense learning (DDSL) according to some embodiments of the present disclosure.

FIG. 3 depicts the first step of DDSL, where an input image 300 is processed by a feature-generating network 302, and NMF 304 and blob-detection 306 are used to identify salient patches within the image. The first step of DDSL is to identify salient patches 308 within the input image 300 (e.g., an image that is a frame from a video). First, the input image 300 is processed by the feature-generating network 302, which in this case is a deep convolutional network. The input image 300 is passed into a deep convolutional network, and the result is that each variable in the network is assigned an activation value. Next, NMF 304 is applied to the resulting activations in multiple layers of the deep convolutional network. This produces a set of components that characterizes potentially salient regions in the input image 300. The regions are mapped to salient patches 400 in the input image 300 by performing blob-detection 306, as shown in FIG. 4.

Figure 4:
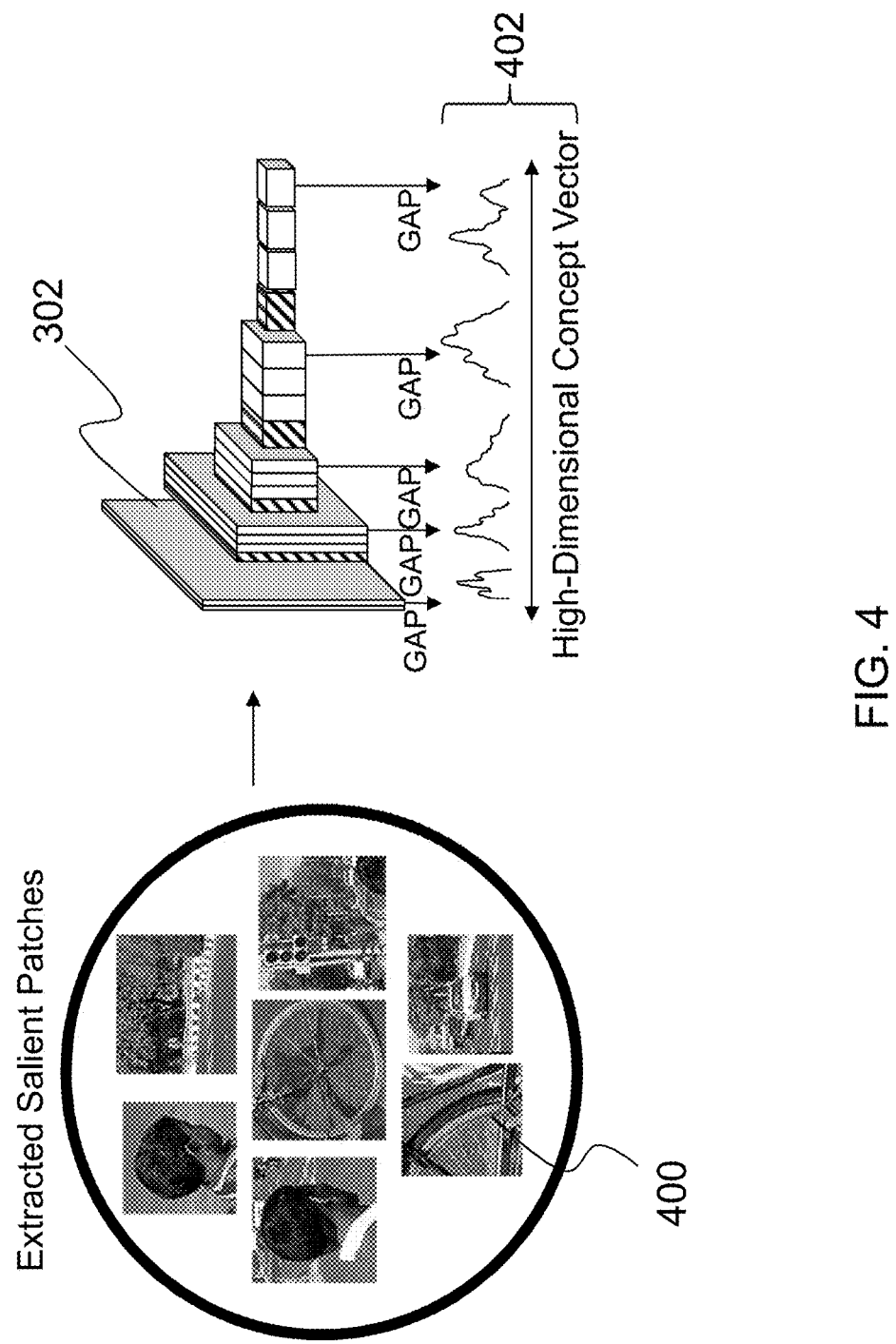
FIG. 4 is an illustration of mapping each patch to a high-dimensional concept vector using a feature-generating network according to some embodiments of the present disclosure.

The second step of DDSL is shown in FIG. 4, wherein the extracted salient patches 400 are translated to high-dimensional concept vectors 402 using the feature-generating network 302. First, a patch 400 is processed by the deep convolutional network. Next, the concept vector 402 for each patch 400 is extracted by averaging the activations across each layer of the feature-generating network 302. This procedure is repeated for each patch 400. The dimensionality of the concept vectors 402 is reduced by Hebbian Principal Component Analysis before being input to the self-tuning neural dynamical system (see FIG. 5A).

The self-tuning neural dynamical system consists of a fully connected layer with spiking leaky integrate-and-fire (LIF) neurons, implementing both excitatory and inhibitory Spike-Timing Dependent Plasticity (STDP), as well as a faster time-scale dynamic known as Short Term Potentiation (STP). This arrangement and combination of features has been shown to create self-tuning, well balanced networks using sparse connectivity (see Literature Reference No. 3). Here, the method is applied to a fully-connected network. The move to a spiking network is motivated by evidence that LIF dynamics are optimal for change detection (see Literature Reference No. 4). Concepts with some shared statistical regularity will cause their shared connections to reflect that regularity through STDP. As such, the set of connection weights becomes a distributed representation of a context. If the low-dimensional concept vector contains 50 dimensions, then the context representation exists in 2450 dimensions. The number of contexts that can be represented in this space is very large. If the context space is restricted to $Z_2$, there are already $2^{2450}$ representable contexts.

Figure 5A:
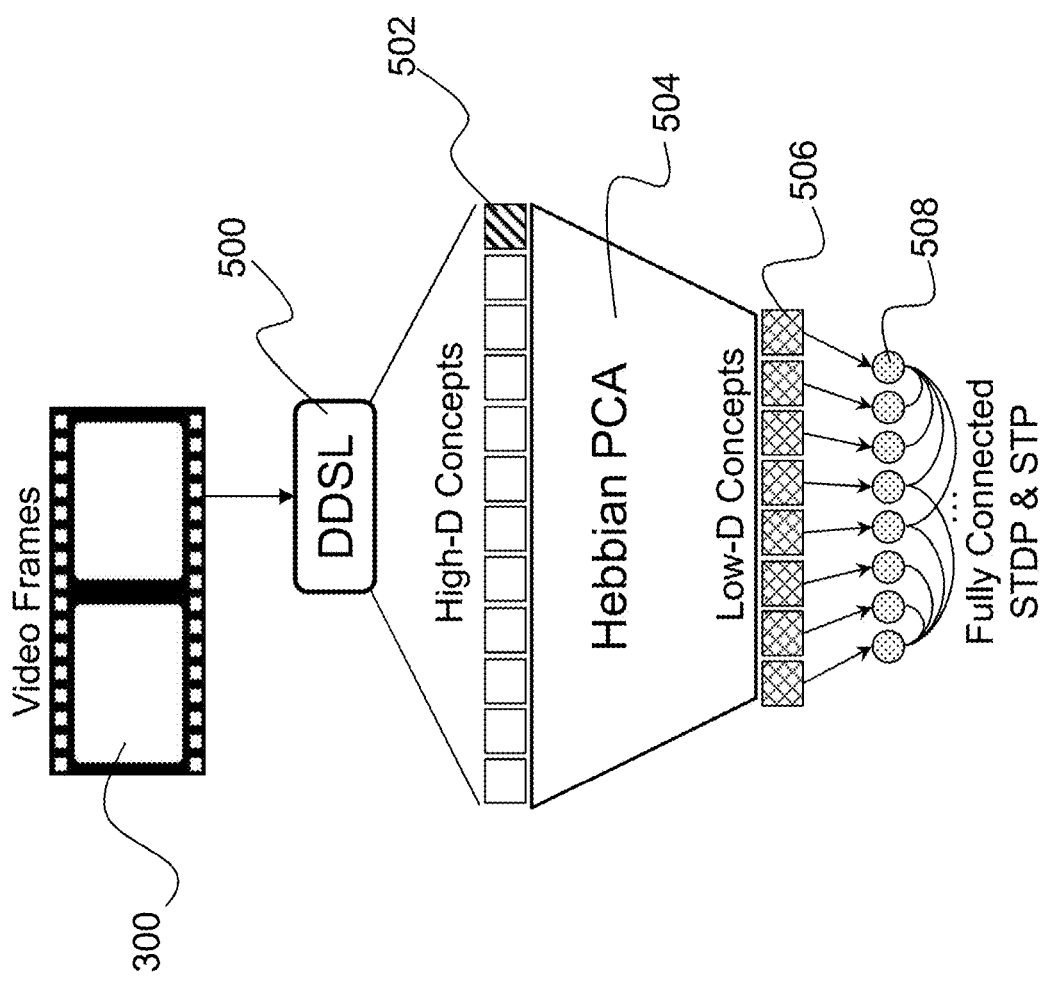
FIG. 5A is an illustration of DDSL creating a high-dimensional representation of concepts according to some embodiments of the present disclosure.
Figure 5B:
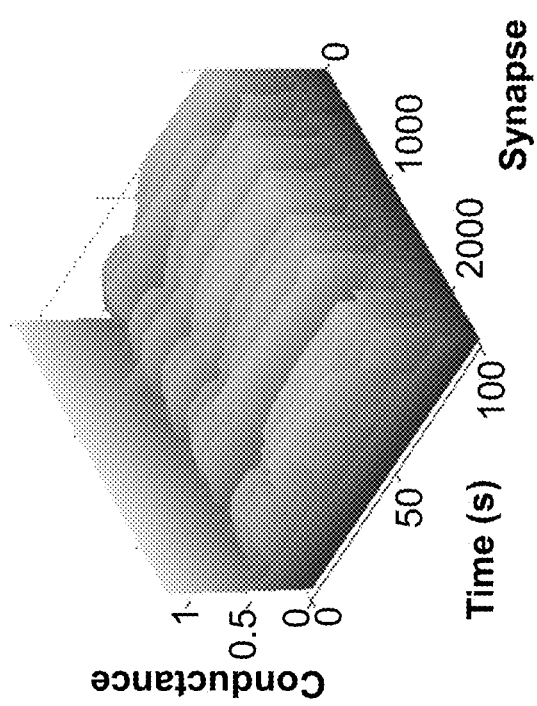
FIG. 5B is an illustration of connection weights in the self-tuning neural dynamical system (SNDS) according to some embodiments of the present disclosure.

FIG. 5A depicts activations sampled from an evolving feature generating network. Dynamic Deep Sense Learning (DDSL) 500 creates a high-dimensional (high-D) representation of concepts 502. Using an online slow time-scale principle component analysis (PCA) technique 504, activations are clustered into low-dimensional (low-D) concepts 506. The low-D concepts 506 are fed into a fully connected, fast time-scale neural STDP and STP dynamical system 508, where connection weights represent context, and quickly identify context switches. FIG. 5B depicts connection weights in the SNDS over time, acting as a distributed context representation. Conductance is a measure of the connection weight, which changes over time. The "synapse" axis shows this changing conductance for each of the 2450 synapses.

For N concepts, the spiking network layer consists of 1.2N neurons, out of which N are excitatory and 0.2N are inhibitory neurons. The excitatory sub-network, E, is fully connected, but the inhibitory sub-network, I, is randomly connected with a connection probability of 0.1. Likewise, E and I are connected to each other with the same probability of 0.1. Finally, the concept vector is input into the network by linearly mapping concept magnitude to firing rates between 0 Hz and 200 Hertz (Hz). Each element of the concept vector is connected to one neuron in E. To create a self-tuning network, STP and STDP parameters were set by a parameter search (see Literature Reference No. 3 for details of the parameter search method). The spiking network parameters discovered through a parameter search for self-tuning dynamics are summarized in the table shown in FIG. 6.

In the fully-connected E network, there are $N^2-N$ connection weights. STDP causes these weights to change depending on the correlation between concepts. As such, the set of weights form a distributed representation of context, where context is taken to be a particular relationship between concepts. In the event of a change in context, connection weights will begin to change rapidly to adjust to the new concept structure. This rapid change can be detected by a simple smoothing filter and threshold function on the values of the synaptic weights.

In experimental studies, an experiment was carried out to test the proper function of the system according to embodiments of the present disclosure. As a result, the system was able to identify contexts reliably and detect the switch between different contexts (e.g., beach, road, airport, ocean, coastal, urban, suburban, forest). Changes in context identification occurred at approximately 3 times slower than input frame rate, or about 100 milliseconds (ms) for a switch. The detection of surprise, however, can happen at faster time-scales, by watching connection strength variability, which will spike before context transition. The behavior of an SNDS can change drastically on the order of about 30 ms (see Literature Reference No. 3). Since the SNDS is critically balanced, a single new, high-activation concept is capable of registering quickly as surprise, and shortly after causing a new context to be registered. For instance, the sudden inclusion of concepts related to a new object category.

Figure 7:
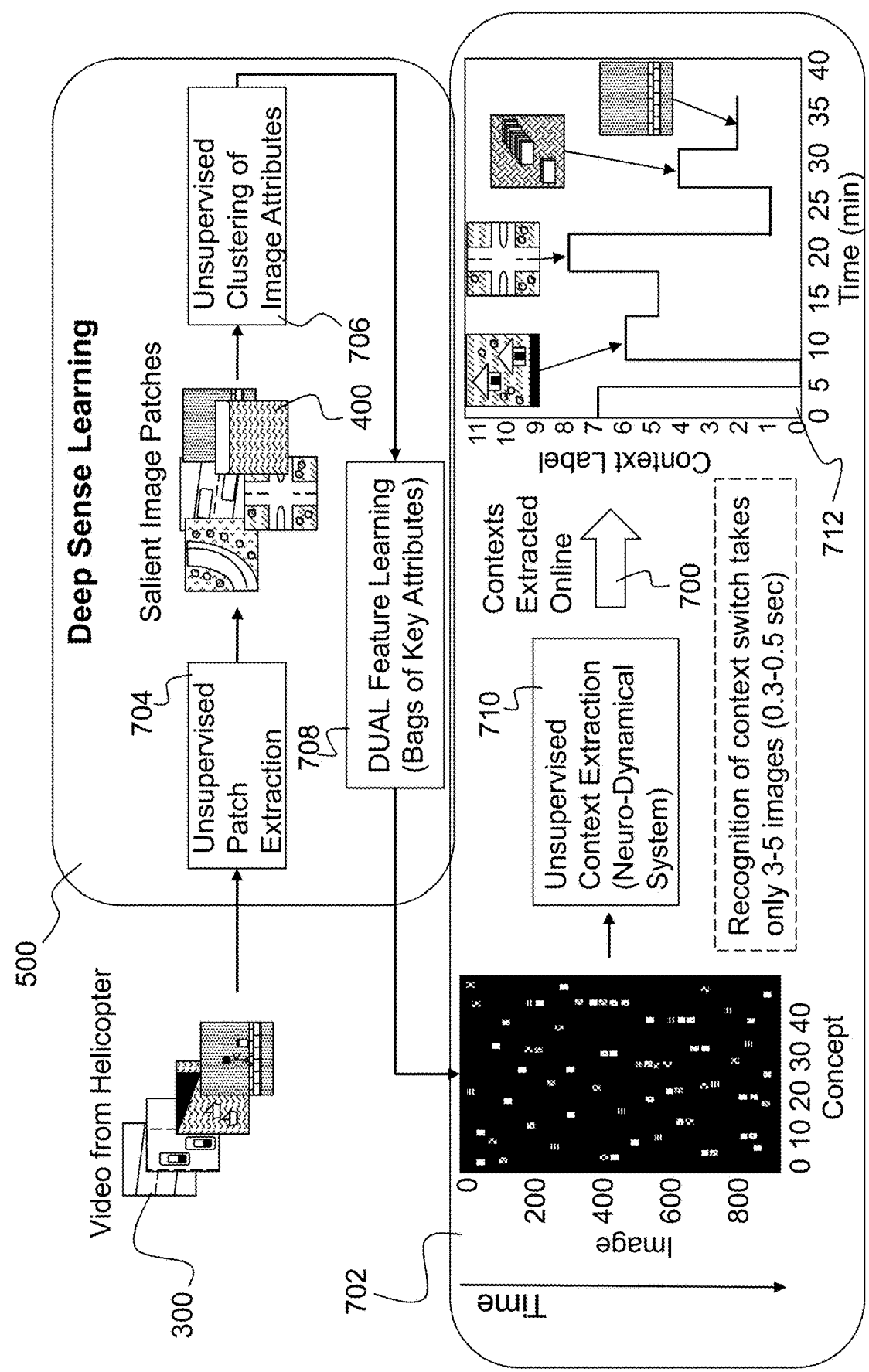
FIG. 7 is an illustration of combining DDSL with a SNDS for context identification according to some embodiments of the present disclosure.

FIG. 7 shows the extraction of stable contexts 700 from input images 300 of a video taken from a helicopter with fast transitions between them, combining DSL 500 with an SNDS 702 for context identification. DSL 500 receives the input images 300 and performs unsupervised patch extraction 704, resulting in salient image patches 400. Using a technique for unsupervised clustering of image attributes 706 provides a time-series of concept activations (bags of key attributes 708) to the SNDS 702 context extraction component for unsupervised context extraction 710. The resulting graph 712 shows that the contexts extracted (element 700) are relatively stable, but transition quickly.

This invention addresses the need for developing better situational awareness for autonomous platforms, such as robots and self-driving cars, because classifying context correctly can reduce errors in object recognition. Moreover, the system will improve the processing of video data in intelligences surveillance reconnaissance (ISR) applications. For instance, a mobile robot with a video camera is tasked with retrieving a particular item, such as a pair of scissors. The likelihood of a pair of scissors being present in the room currently occupied by the robot depends on the context. For example, scissors are much more likely to be present in a kitchen versus a bedroom. The robot can use the system described herein to identify that it is in a bedroom based on the context (e.g., objects in the room) and use this information along with its mapping and reasoning software to proceed towards a nearby kitchen.

For an autonomous vehicle using the system according to embodiments of the present disclosure, the context may be a safe versus a dangerous intersection. The vehicle approaches the intersection and needs to decide whether or not it's safe to make a left-hand turn. The invention described herein identifies many cars travelling at high-speeds and a pedestrian in the cross-street, which indicates a dangerous intersection. The vehicle uses this information along with its reasoning software to make a right-hand turn instead.

As described above, the system according to embodiments of the present disclosure addresses the need for robust machine vision systems on autonomous platforms (e.g., drones, unmanned aerial vehicles (UAVs)) and autonomous vehicles. The invention described herein provides the capability of effectively adapting to changes in context (e.g., change in scenery, change in surrounding objects). For instance, the system can generate an alert when a context change is detected, such that the autonomous platform is caused to perform an automatic operation, such as a braking or swerving operation to avoid hitting an object. The alert can be an audible alert (e.g., beep, tone) and/or a visual alert (e.g., light or message on dashboard). For example, if the object is a stop sign, the system may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

If a change of context is detected in a vehicle system, actuators may cause actuation of the brake or actuator, turn the vehicle, and turn on/off the air conditioning, windshield wipers, or headlights based on environment/weather related context, such as temperature, rain, frost, fog, and low light (night) conditions. A UAV can exhibit different behaviors depending on whether an approaching aircraft is friend or foe, such as evasive maneuvers (e.g., diving or climbing in altitude).

Additionally, the system can be utilized for monitoring the safety of a plant that has a controller. The plant may have mechanical, electrical or electro-mechanical components, or chemical processes that need to be shut down in the event of an emergency. In this case, the invention described herein would detect shifts in the operating patterns of one or more components that would indicate a shift to a context that is not safe for continued operation. The controller would respond to the generated alert by either shutting the one or more components down or applying another safety mechanism (e.g., a circuit breaker) to bring the system back within the context of normal (safe) operation.

Figure 8:
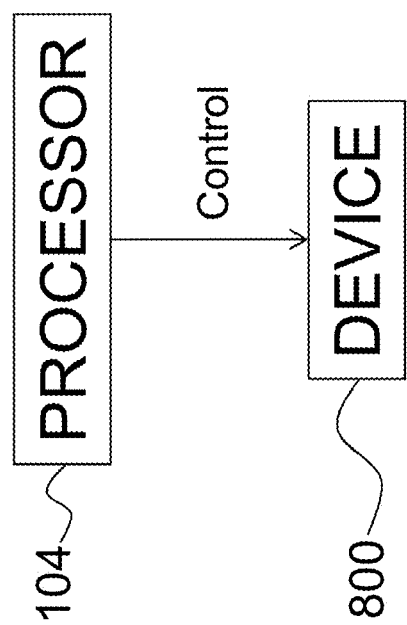
FIG. 8 is an illustration of using a processor to control a device based on the detected change of context in a video stream according to some embodiments of the present disclosure.

FIG. 8 is an illustration of using a processor 104 to control a device 800 on an autonomous platform based on a detected change of context in a video stream, as described above. Non-limiting examples of devices 800 that can be controlled via the processor 104 based on a detected change of context include a vehicle or a vehicle component, such as a brake, a steering mechanism, suspension, or safety device (e.g., airbags, seatbelt tensioners, etc.), or any of the other examples provided above. Further, the vehicle can be a UAV, an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting change of context in a video stream on an autonomous platform, the system comprising:
one or more processors and a non-transitory memory having instructions encoded thereon such that when the instructions are executed, the one or more processors perform operations of:
extracting salient patches from a plurality of image frames in the video stream;
translating each salient patch to a concept vector;
enervating a recurrent neural network with the concept vector, resulting in activations of the recurrent neural network;
classifying the activations of the recurrent neural network;
mapping the classified activations onto context classes;
detecting a change of context class in the plurality of image frames; and
causing the autonomous platform to perform an automatic operation to adapt to the change of context class.

2. The system as set forth in claim 1, where in extracting the salient patches, the one or more processors further perform operations of:
processing each image frame in the plurality of image frames with a feature-generating network, resulting in a set of activations;
applying non-negative matrix factorization to the set of activations in a plurality of layers of the feature-generating network, resulting in potentially salient regions in each image frame; and
performing blob-detection for mapping the potentially salient regions to the salient patches.

3. The system as set forth in claim 1, where in translating each salient patch to a concept vector, the one or more processors further operations of:

processing each salient patch by a feature-generating network having a plurality of layers;
extracting high-dimensional concept vectors by averaging the set of activations across each layer of the feature-generating network; and
reducing the high-dimensional concept vectors to a low-dimensional concept vector of concept components using Hebbian Principal Component Analysis.

4. The system as set forth in claim 1, wherein a set of connection weights in the recurrent neural network are a distributed representation of a context.

5. The system as set forth in claim 1, wherein the recurrent neural network comprises a fully connected layer with spiking leaky integrate-and-fire (LIF) neurons, implementing both excitatory and inhibitory Spike-Timing Dependent Plasticity (STDP) and Short Term Potentiation (STP).

6. The system as set forth in claim 1, wherein the recurrent neural network comprises a spiking network layer having an excitatory sub-network and inhibitory sub-network, wherein the excitatory sub-network is fully connected and the inhibitory sub-network is randomly connected with a predetermined connection probability, and wherein the excitatory sub-network and the inhibitory sub-network are connected with the predetermined connection probability.

7. A computer implemented method for detecting change of context in a video stream on an autonomous platform, the method comprising an act of:
causing one or more processors to execute instructions encoded on a non-transitory computer-readable medium, such that upon execution, the one or more processors perform operations of:
extracting salient patches from a plurality of image frames in the video stream;
translating each salient patch to a concept vector;
enervating a recurrent neural network with the concept vector, resulting in activations of the recurrent neural network;
classifying the activations of the recurrent neural network;
mapping the classified activations onto context classes;
detecting a change of context class in the plurality of image frames; and
causing the autonomous platform to perform an automatic operation to adapt to the change of context class.

8. The method as set forth in claim 7, where in extracting the salient patches, the one or more processors further perform operations of:
processing each image frame in the plurality of image frames with a feature-generating network, resulting in a set of activations;
applying non-negative matrix factorization to the set of activations in a plurality of layers of the feature-generating network, resulting in potentially salient regions in each image frame; and
performing blob-detection for mapping the potentially salient regions to the salient patches.

9. The method as set forth in claim 7, where in translating each salient patch to a concept vector, the one or more processors further operations of:
processing each salient patch by a feature-generating network having a plurality of layers;
extracting high-dimensional concept vectors by averaging the set of activations across each layer of the feature-generating network; and
reducing the high-dimensional concept vectors to a low-dimensional concept vector of concept components using Hebbian Principal Component Analysis.

10. The method as set forth in claim 7, wherein a set of connection weights in the recurrent neural network are a distributed representation of a context.

11. The method as set forth in claim 7, wherein the recurrent neural network comprises a fully connected layer with spiking leaky integrate-and-fire (LIF) neurons, implementing both excitatory and inhibitory Spike-Timing Dependent Plasticity (STDP) and Short Term Potentiation (STP).

12. The method as set forth in claim 7, wherein the recurrent neural network comprises a spiking network layer having an excitatory sub-network and inhibitory sub-network, wherein the excitatory sub-network is fully connected and the inhibitory sub-network is randomly connected with a predetermined connection probability, and wherein the excitatory sub-network and the inhibitory sub-network are connected with the predetermined connection probability.

13. A computer program product for detecting change of context in a video stream on an autonomous platform, the computer program product comprising:
   computer-readable instructions stored on a non-transitory computer-readable medium that are executable by a computer having one or more processors for causing the processor to perform operations of:
      extracting salient patches from a plurality of image frames in the video stream;
      translating each salient patch to a concept vector;
      enervating a recurrent neural network with the concept vector, resulting in activations of the recurrent neural network;
      classifying the activations of the recurrent neural network;
      mapping the classified activations onto context classes;
      detecting a change of context class in the plurality of image frames; and
      causing the autonomous platform to perform an automatic operation to adapt to the change of context class.

14. The computer program product as set forth in claim 13, where in extracting the salient patches, the one or more processors further perform operations of:
   processing each image frame in the plurality of image frames with a feature-generating network, resulting in a set of activations;
   applying non-negative matrix factorization to the set of activations in a plurality of layers of the feature-generating network, resulting in potentially salient regions in each image frame; and
   performing blob-detection for mapping the potentially salient regions to the salient patches.

15. The computer program product as set forth in claim 13, where in translating each salient patch to a concept vector, the one or more processors further operations of:
   processing each salient patch by a feature-generating network having a plurality of layers;
   extracting high-dimensional concept vectors by averaging the set of activations across each layer of the feature-generating network; and
   reducing the high-dimensional concept vectors to a low-dimensional concept vector of concept components using Hebbian Principal Component Analysis.

16. The computer program product as set forth in claim 13, wherein a set of connection weights in the recurrent neural network are a distributed representation of a context.

17. The computer program product as set forth in claim 13, wherein the recurrent neural network comprises a fully connected layer with spiking leaky integrate-and-fire (LIF) neurons, implementing both excitatory and inhibitory Spike-Timing Dependent Plasticity (STDP) and Short Term Potentiation (STP).

18. The computer program product as set forth in claim 13, wherein the recurrent neural network comprises a spiking network layer having an excitatory sub-network and inhibitory sub-network, wherein the excitatory sub-network is fully connected and the inhibitory sub-network is randomly connected with a predetermined connection probability value, and wherein the excitatory sub-network and the inhibitory sub-network are connected with the predetermined connection probability value.

* * * * *